UNITED STATES PATENT OFFICE.

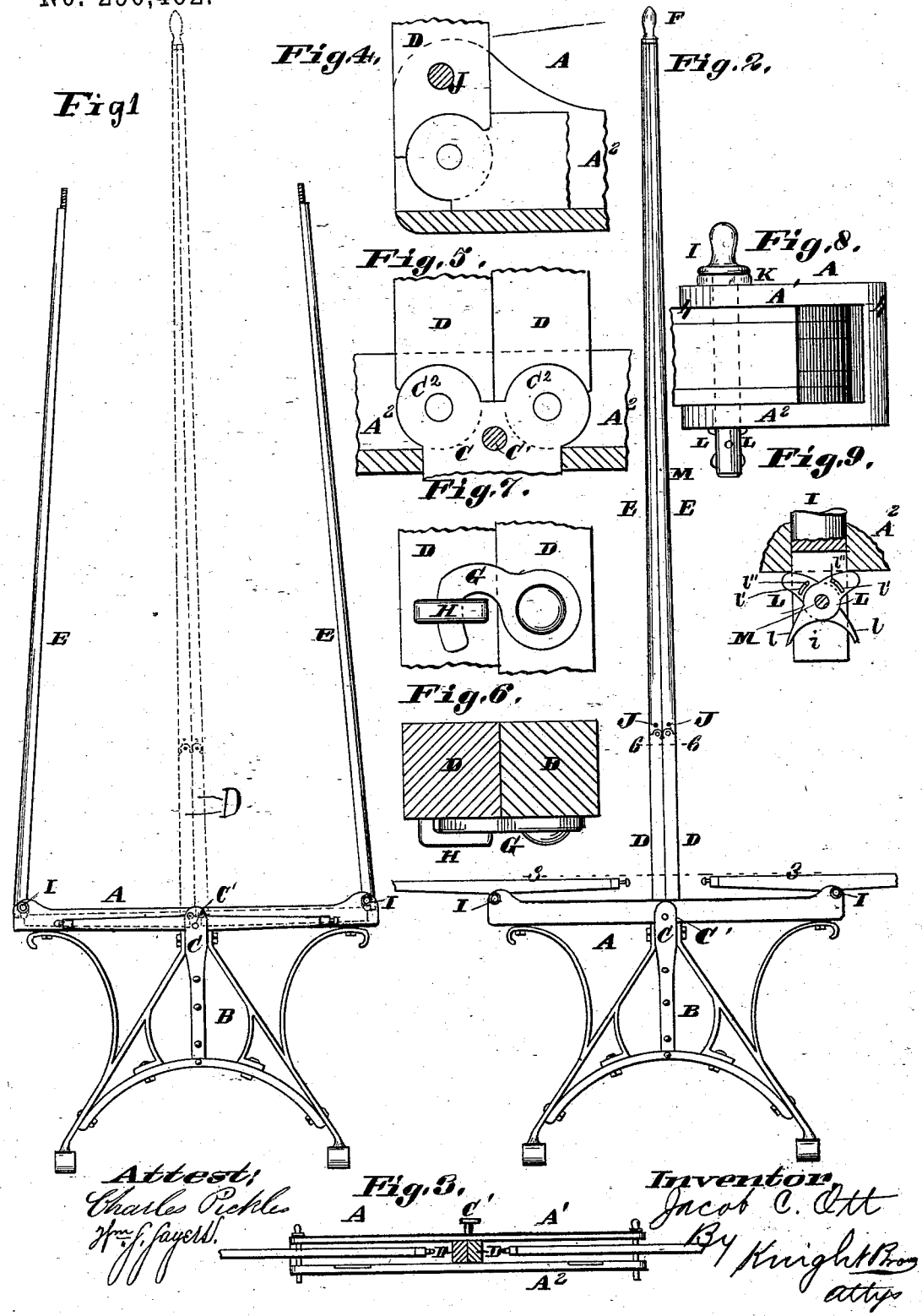

JACOB C. OTT, OF CENTRALIA, ILLINOIS.

CONVERTIBLE SHAFT AND TONGUE FOR VEHICLES.

SPECIFICATION forming part of Letters Patent No. 290,462, dated December 18, 1883.

Application filed May 15, 1883. (No model.)

*To all whom it may concern:*

Be it known that I, JACOB C. OTT, of Centralia, in the county of Marion and State of Illinois, have invented a certain new and useful Improvement in Convertible Shafts and Tongues for Vehicles, of which the following is a full, clear, and exact description, reference being had to the accompanying drawings, forming part of this specification, and in which—

Figure 1 is a top view of the device arranged for shafts or thills. Fig. 2 is a similar view of the tongue or pole. Fig. 3 is a transverse section taken on line 3 3, Fig. 2, looking back. Fig. 4 is a section taken on line 4 4, Fig. 8. Fig. 5 is an enlarged horizontal section of the center of the cross-bar, the device being arranged for a tongue. Fig. 6 is a transverse section taken on line 6 6, Fig. 2, enlarged, looking back. Fig. 7 is an enlarged detail bottom view of the tongue, showing a part back of the section-line, Fig. 6, illustrating the hook for connecting the two parts of the tongue, (or, in other words, the shafts.) Fig. 8 is an enlarged end view of the cross-beam, showing the device arranged for shafts; and Fig. 9 is an enlarged detail vertical section illustrating the manner of holding the bolts in place.

My improvement relates to convertible shafts and tongues for vehicles; and my invention consists in the construction hereinafter described, and pointed out in the claims.

Referring to the drawings, A represents the cross beam or piece, consisting of two pieces, A' A², connected at the back, (see Figs. 3 and 8,) provided with suitable hounds, B, for connecting it to a vehicle. (See Figs. 2 and 3.)

In the middle or center of the beam A is secured a metallic block or piece, C, by means of a pin, C', and having ears C² C², (see Fig. 5,) and to this block are hinged two lengths, D D, which are adapted to be opened out, as shown in Figs. 2, 3, and 5, when they form part of the tongue or pole, or to be folded back within the beam, as shown in Figs. 1, 4, and 8. To the outer ends of these lengths are hinged the shafts or thills E E, which form the tongue or pole when brought together, as shown in Fig. 2. The outer ends of the shafts are screw-threaded (see Fig. 1) to receive a connecting-cap, F, when the device is used as a tongue, (see Fig. 2,) and when used as a tongue the lengths D are connected by a hook and staple, G H, (see Figs. 6 and 7,) or by other suitable means. It will thus be seen that when the lengths are brought back and secured to the beam the device forms a convenient pair of shafts of the proper length, and when opened out, bringing the shafts together, a convenient tongue or pole of the proper length, and the device is easily and quickly changed from one to the other, and the change can be made without the use of an instrument. The lengths are held to the beam, when the device is arranged for shafts, by means of bolts or pins I, passing through the two parts of the beam and through holes J in the shafts. (See Figs. 1, 2, 3, 4, and 8.) These bolts preferably have elastic washers K between their heads and the beams, (see Fig. 8,) and are held in place by plates L, pivoted in their slotted lower ends, $i$, by transverse pins M. (See Figs. 8 and 9.) The plates L are each provided with a handle, $l$, at one end, and a slot, $l'$, at the other end, a pin, $l''$, working in the slot to guide the plate. The plates are so arranged that their upper ends will drop outward as soon as the bolt is fully inserted, engaging beneath the beam, as shown, and as the bolts are just long enough for the plates to drop out and engage the beam, by compressing the elastic-washers, it will be seen that they cannot move and rattle. The pin C' may be held in place in the same manner.

When the device is arranged as a tongue, single-trees may be secured to the ends of the beam by the bolts I, for two horses. (See Figs. 2 and 3.) When arranged for one horse, the single-tree is secured to the beam by the bolt C'. (See Fig. 1.)

The under part of the forward end of one or both of the shafts would be provided with a suitable projection to receive the loop of the neck-yoke when the device is used as a tongue.

I claim as my invention—

1. The combination, with suitable hounds, of a cross-beam, A, consisting of two plates, A' A², a block, C, having ears C² and secured to the center of the plates and to the hounds, two lengths, D D, hinged to said ears, and shafts E E, hinged to said lengths and secured together by suitable means to form a tongue, as set forth.

2. The combination, with suitable hounds, of a cross-beam consisting of two plates, A' A², the block C, having ears C² C², and secured to the cross-beam by bolt C', the lengths D D, hinged to said ears at their rear ends, and shafts E E, hinged to their outer ends, between the plates of the cross-beam, and secured to the ends of the plates by bolts I I, the lengths of the shafts being concealed between the plates, as shown and described.

3. The combination, with a cross-beam, of the securing-bolt having a collar and slotted lower end, elastic washer between the collar of the bolt and the cross-beam, and crossed plates L, pivoted in the slotted lower end of the bolt by a transverse pin, M, each plate having a handle, $l$, at its lower end, and a slot, $l'$, in its upper end, receiving a guide-pin, $l''$, as set forth.

JACOB C. OTT.

In presence of—
SAML. KNIGHT,
GEO. H. KNIGHT.